United States Patent [19]

Ludwa

[11] 4,239,792
[45] Dec. 16, 1980

[54] SURFACE WIPING DEVICE

[75] Inventor: Raymond J. Ludwa, Fairfield, Ohio

[73] Assignee: The Procter & Gamble Company, Cincinnati, Ohio

[21] Appl. No.: 9,722

[22] Filed: Feb. 5, 1979

[51] Int. Cl.³ .............................................. B32B 27/14
[52] U.S. Cl. ................................ 428/198; 428/286; 428/287
[58] Field of Search ................. 128/156, 157, 296; 428/137, 138, 212, 229, 286, 287, 296, 475, 476, 479, 508, 510, 532, 198

[56] References Cited

U.S. PATENT DOCUMENTS

| | | | |
|---|---|---|---|
| 2,862,251 | 12/1958 | Kalwaites | 19/161 |
| 2,932,839 | 4/1960 | Flanigan et al. | 15/122 |
| 2,942,285 | 6/1960 | Gray | 15/209 |
| 3,081,514 | 3/1963 | Griswald | 28/78 |
| 3,301,746 | 1/1967 | Sanford et al. | 162/113 |
| 3,345,243 | 10/1967 | Kalwaites | 428/131 |
| 3,377,643 | 4/1968 | Terg et al. | 15/118 |
| 3,616,157 | 10/1971 | Smith | 15/209 |
| 3,650,882 | 3/1972 | Thomas | 156/209 |
| 3,879,257 | 4/1975 | Gentile et al. | 156/183 |
| 3,949,130 | 4/1976 | Sabee et al. | 428/192 |
| 3,994,771 | 11/1976 | Morgan et al. | 428/154 |
| 4,068,666 | 1/1978 | Shiff | 128/296 |

OTHER PUBLICATIONS

Research Disclosure No. 17060, (Jun. 1978), E. I. Du Pont de Nemours & Co., Inc.

Primary Examiner—Marion McCamish
Attorney, Agent, or Firm—Monte D. Witte; John V. Gorman; Richard C. Witte

[57] ABSTRACT

Disposable devices useful for cleaning and wiping hard surfaces. The devices have a core interposed between and laminated to two outer layers. The core is preferably an absorbent paper web, while the outer layers are preferably apertured nonwoven fabrics having defined properties. The wiping device is strong, absorbent, and will retain sufficient water after manual wringing to clean soiled surfaces, and will leave the cleaned surface essentially dry.

10 Claims, 2 Drawing Figures

SURFACE WIPING DEVICE

TECHNICAL FIELD

This invention is concerned with disposable surface wiping devices. More particularly, it relates to laminated structures having at least two surface contacting elements and at least one inner absorbent element.

BACKGROUND ART

Almost all undertakings or activities in modern society—whether industrial, business, service, or consumer oriented, whether performed for profit or non-profit motives—involve at some point the use of an implement or device for wiping hard surfaces. Water and other liquids, dirt, soil, grease, dust and the like must occasionally or frequently be removed from hard surfaces, i.e. a surface must be wiped or cleaned. Industrial workers must remove grease and accumulated dirt from machines, mechanics from automobiles. Office workers and clerks must remove ink from duplicating machines, soil from cabinets, and spilled liquid from desks. Restaurant workers and those engaged in domestic activities must remove grease, liquids, food particles, and other soil from stoves, appliance surfaces, counter tops, and table tops. Almost every person in his home must occasionally wipe spills or soil from surfaces.

All manner of objects have been used as surface wiping devices or implements. Among the most common are rags (scraps of woven fabrics) and cloth towels. In modern times, disposable implements such as paper towels have been increasingly used. While the reasons for this increased use of disposable implements are many and varied, some of the more important are cost, elimination of the need for cleaning or laundering, convenience of supply, relative certainty of initial cleanliness, and enhanced performance. The surface wiping devices of this invention fulfills all these enumerated criteria.

While the use of surface wiping devices is essentially coextensive with modern human activity, and while the surface wiping devices of this invention are useful in a variety of activities and situations, emphasis in this specification shall be placed on the use of surface wiping devices in restaurants where they are used to clean counter tops and table tops.

Surface wiping devices as used in restaurants must of necessity have a number of physical and performance characteristics.

First, they must be absorbent so as to be able to absorb spilled liquids such as water, coffee, tea, milk and the like. They must also be able to absorb small quantities of fats and oils.

Second, they must be durable enough to perform their assigned tasks and to withstand enough usage to make their use economical. Durability is mainifested not only by the ability to withstand shredding, tearing, pilling, etc. during actual use, but also the ability to withstand rinsing and manual wringing.

Third, the surface wiping devices must retain, after manual wringing, enough water or other cleaning solution to facilitate the cleaning of table tops. This water may be held in such a way that it is easily displaced from the device during actual table wiping (as by pressure applied manually by the user) so as to be available on the surface of loosening and softening soils.

Fourth, they must render the wiped table essentially dry. A table is essentially dry when, immediately after wiping, the water remaining on the surface will evaporate under ambient conditions in less than about 30 seconds. Further, and importantly, the water remaining on the surface must be present in the form of small droplets so as to avoid the presence of visible streaks and spots on the surface after it dries under ambient conditions.

Fifth, the surface wiping device must be constructed so as to retard evaporation of the water or cleaning solution contained therein. This requirement follows from the habit of restaurant workers of rinsing the surface wiping device only infrequently. The rinsed device must be used several times between rinsings; the retained liquid must not evaporate too rapidly or the device will become too dry to effectively clean surfaces.

Sixth, the device must be capable of retaining small particles or crumbs of food and the like.

Heretofore, the surface wiping devices used in restaurants have included durable and disposable items. "Durable," as used herein, refers to devices intended to be used, cleaned as by laundering, and used again numerous times over an extended period of time. "Disposable," as used herein, refers to devices intended to be used at most a few times and then discarded. While the concept of a disposable product excludes the laundering of the device, disposable devices may be rinsed once or several times during their effective life; such rinsing is not to be considered to be laundering as used in the concept of durable devices.

Durable devices used in restaurants include terry and ribbed terry towels of varying sizes. These towels are woven textile devices and are generally made from cotton or blends of cotton and synthetic fibers. Another common durable surface wiping device is commonly known as a bar swipe and is a hard finished, woven textile sometimes referred to as "linen," but which is actually made from cotton or a blend of cotton and synthetic fibers. While these products have been used for many years and are satisfactory in some respects (such as their high absorbent capacity and their strength) they do have certain shortcomings. They possess all the storage and laundering problems confronting durable products in general. In addition, they are generally initially expensive and an adequate stock requires a relatively large capital outlay. Alternatively, many restaurants avoid the capital outlay by renting these durable devices, but while this tactic reduces initial capital outlay, it does not reduce overall cost. Further, they suffer from a major performance disability in that a recently rinsed device will not effectively dry a table or counter top. By their inherent nature, these durable products generally leave the wiped surface wet; the residual water is usually in the form of large drops which contribute to streaking and spotting. Durables do have excellent feel or hand. Because of their traditional use, these durable devices are frequently regarded by users as benchmarks against which disposable products are evaluated.

The disposable products which have heretofore been used as surface wiping devices in restaurants, or which have been directly or indirectly recommended for such usage, are many and varied. Among the more familiar are ordinary paper towels. Paper towels are disposable products formed from one or more sheets of absorbent paper tissue. Paper tissue made according to U.S. Pat. No. 3,301,746 (issued to Sanford and Sisson on Jan. 31, 1967) has, in particular, been found to be particularly useful. This paper tissue has been used in single ply and in multilayer structures of various designs such as that described in U.S. Pat. No. 3,650,882 (issued to Thomas on Mar. 21, 1972).

In addition to the devices made from paper, disposable devices made from nonwoven fabrics have been recommended as wiping cloths and towels. Nonwoven fabrics are generally understood to be fabrics produced directly from fibers without the use of conventional spinning, weaving or knitting operations. Nonwoven fabrics normally contemplated for use in wiping cloths are those sometimes referred to as bonded webs (assemblages of fibers which have been printed or impregnated with a bonding agent which serves to hold the individual fibers together) and nonwoven webs wherein the strength and unity of the assemblage is enhanced by mechanical entanglement of the fibers. In general, the fibers used in nonwoven webs useful in surface wiping devices are textile-like in nature. Griswold in U.S. Pat. No. 3,081,514 (issued Mar. 19, 1963), Smith in U.S. Pat. No. 3,616,157 (issued Oct. 26, 1971), and Kalwaites in U.S. Pat. No. 3,345,243 (issued Oct. 3, 1967) have, for example, recommended the use of nonwoven fabrics in wiping devices.

Others have suggested the use of composite structures as disposable wiping devices. For example, E. I. DuPont de Nemours & Co., Inc. in Research Disclosure #17060 (June, 1978) suggests the use of webs of synthetic fibers which have been united with paper sheets by mechanical needling, fluid entanglement or bonding to produce a composite structure. Flanigan and Flanigan in U.S. Pat. No. 2,932,839, issued Apr. 19, 1960, describe a "cleansing cloth" comprised of a plurality of paper layers. The outer layers are "paper of a high degree of permeability and high wet strength" while the inner layers are "of an absorbent cellulose paper." Two other U.S. patents describe composite wiping devices and briefly discuss the theory behind the operation of such devices: U.S. Pat. No. 3,377,643 (issued to Teng and Kendall on Apr. 16, 1968) and U.S. Pat. No. 3,879,257 (issued to Gentile et al. on Apr. 22, 1975.)

DISCLOSURE OF THE INVENTION

This invention concerns disposable surface wiping devices comprising a plurality of dissimilar elements laminated to form a single, unitary, multilayer device. The outer, or surface contacting, elements of the device are nonwoven fabrics of water sensitive fibers. The inner, or core, elements are absorbent materials such as paper. The outer and the inner elements, which are laminated as by bonding with latex adhesives, are carefully selected to have physical properties falling within narrow, specified ranges. When the outer and inner elements have properties falling within the narrow, specified ranges, the disposable surface wiping device comprised of those elements has an enhanced ability to clean a large area of hard surface while, at the same time, leaving the surface essentially dry and free of streaks, spots, and films; is strong enough for practical usage; and remains usefully damp between rinsings.

Accordingly, it is an object of this invention to provide an improved disposable device for cleaning hard surfaces.

Another object of this invention is to provide an improved disposable device for wiping liquid spills from hard surfaces.

Still another object of this invention, is to provide an improved disposable device for wiping wet or damp surfaces while leaving time essentially dry and free of streaks, spots, or films.

A further object of this invention is to provide a disposable device having high water absorption properties, relatively long effective life for a disposable product, and relatively low cost.

These and other objects will become readily apparent from a reading of the detailed description of the invention which follows.

DETAILED DESCRIPTION OF THE INVENTION

While this specification concludes with claims particularly pointing out and distinctly claiming the subject matter regarded as the invention, it is believed that the invention will be better understood through a reading both of the following detailed description of it and of the nonlimiting examples appended thereto and by study of the associated drawings.

The disposable surface wiping device of this invention comprises a plurality of layers of dissimilar materials laminated to form a unified whole. Preferably, the surface wiping device of this invention comprises three discrete elements laminated to form a single device. As used herein, the term "laminated" refers to any method of uniting individual elements. Such methods include the use of adhesives to join two or more elements wherein the adhesive is applied in continuous or discontinuous patterns. While neither technique is a preferred method, the term "laminated" can refer to the union of two or more elements by sewing or by physical entanglement of fibers of one element with the fibers of another element as by needling.

The disposable surface wiping devices of this invention can be presented in any convenient form such as, for example, single units of usable size or as a continuous roll of product with transverse perforations permitting the disengagment of single units of usable size from the roll. Single units can be square, rectangular, or any other convenient shape. When rectangular, they can be from about 17 centimeters on an edge to about one meter on an edge. Preferable, a single unit is a rectangle about 35 centimeters by about 46 centimeters.

The disposable surface wiping device of this invention must have an inner absorbent element which can also be referred to as a core, an inner layer, or an inner. The device must have two outer surface contacting elements which can also be referred to as outers, outer layers, or overwraps. While the surface wiping device has just been described in terms of a single core and two outer layers, it is to be understood that a plurality of subelements can function, in appropriate circumstances, as cores and outer layers.

Figure 2:
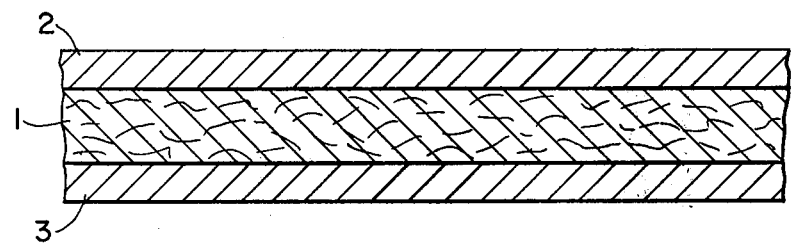
FIG. 2 is a cross-sectional view (taken along line 2–2 of FIG. 1) of a surface wiping device of this invention as shown in FIG. 1 and shows the elements thereof and their arrangement relative to one another.

FIG. 2 is a cross-sectional view of a preferred embodiment of a disposable surface wiping device of this invention. Reference numeral 1 indicates the inner absorbent element or core. Reference numerals 2 and 3 indicate surface contacting elements. While these two surface contacting elements can be dissimilar, they are preferably identical.

Generally, each outer layer is a single ply of nonwoven fabric. While an outer can comprise multiple plies and while it can be a woven fabric, considerations of cost, utility, availability, etc. indicate that a single ply of nonwoven material is preferred. In a like vein, the core is generally a single, unitary element, but it can comprise multiple plies of subelements. Preferably, the core is a paper-based material, although it can be a mass of either nonwoven or woven fabric or a mass of foam materials, provided all the criteria hereinafter recited are met.

In the description of the basic elements of the surface wiping device of this invention, the core is described as an absorbent element. It should not be inferred from this description that the outer is not also absorbent. In fact, as will be discussed in greater detail hereinafter, the outer layer must have some finite absorbent capacity and the outer layers do contribute to the overall absorbent capacity of the surface wiping device.

The core of the surface wiping device of this invention comprises a mass of material having absorbent capacity, compressibility, wicking rate and physical strength as hereinafter defined. Preferably, the core is an absorbent paper web. Other materials which can be used include bonded airfelts formed from wood pulp fibers; a single ply and multiple plies of nonwoven fabric; a single ply and multiple plies of woven fabric; and absorbent cellulose, polyurethane, and polyester foams. Regardless of the material of construction, the core should have certain properties as hereinafter described.

First, the core preferably has an absorbent capacity of more than about 6.5 grams per gram.

As used herein, absorbent capacity is defined as the amount of water, in grams, which one gram of material will hold. To determine absorbent capacity, a sample is weighed to determine its dry weight. The sample is then submerged horizontally in distilled water at room temperature to a depth of 7.6 centimeters for 3 minutes. It is then removed from the water and allowed to drain in a horizontal position on an open mesh support for two minutes before it is rotated, on the support, through an angle of 75° from the horizontal and allowed to drain in that new orientation for an additional one minute. The drained sample is weighed to determine its wet (saturated) weight. The difference between the wet and dry weights is the quantity of water absorbed by the sample; dividing this difference by the dry weight of the sample gives the absorbent capacity of the sample in terms of weight of water absorbed per unit weight of sample.

In addition, the core preferably has a dry horizontal wicking rate of less than about 30 seconds and a wet horizontal wicking rate of less than about 20 seconds.

As used herein, wicking rate is defined as the time required for one-tenth of a milliliter of distilled water to be absorbed by a horizontal sample when the water is applied to the lower surface of the sample under zero hydrostatic pressure. Lower times indicate faster wicking rates. Wet wicking rate is measured on samples which have first been saturated with distilled water and then passed between the opposed rolls of a model LW-489 Atlas Laboratory. Wringer (as manufactured by the Atlas Electric Devices Company, Chicago, Ill.) to which a force of 18.75 kilograms per linear centimeter has been applied.

The compressibility of suitable cores is typically on the order of about 25%. As used herein, compressibility is defined as the thickness, in terms of percent of initial wet thickness, lost by a sample when the wet sample is subjected to a specified pressure. To measure compressibility, the material to be tested is cut into squares approximately 8.9 centimeters on a side.

A sufficient number of these sample squares to yield a stack approximately 2.5 centimeters thick are placed one atop another. The resulting stack of sample squares is placed in a holder having four side members and a foraminous bottom. In size, the holder is somewhat larger than the stack of sample squares to allow for expansion of the samples as they are wetted. The sample stack is submerged in room temperature distilled water for 30 seconds. Immediately after removal from the water, the initial height of the stack is determined by applying a uniformly distributed initial loading of 17.6 grams per square centimeter for 30 seconds and measuring the initial height under the loading. The initial loading is removed and 30 seconds later a uniformly distributed final loading of 70.3 grams per square centimeter is applied to the sample stack and the final height under that load is measured. Percent compressiblity is defined as one hundred times the quotient obtained by dividing the difference between the initial and final heights by the initial height. As noted above, compressibility is a measure of the thickness lost by the sample as a load is applied. Lower values of compressibility indicate samples which are less compressible.

Still further, the core must be strong enough, when incorporated into a surface wiping device, to withstand the stresses and abuses encountered in use, particularly as the surface wiping device is subjected to manual wringing. In general, the core should possess a combination of tensile strength and elongation properties to allow it to be used in practical applications. At lower tensile strengths, the ability of the core to stretch beomes increasingly important. Tensile strengths of at least about 30 grams per centimeter and elongation of more than about 5% are generally adequate. Tensile and elongation are measured according to T.A.P.P.I. Method T-494 os-70, which is incorporated herein by reference. In the final analysis, a core possesses the requisite strength if, after incorporation into a disposable surface wiping device, the surface wiping device will withstand the hereinafter described simulated manual wringing test.

Finally, the core preferably has a basis weight of from about 16 to about 80 grams per square meter.

From a reading of the foregoing, it should be readily apparent to those skilled in the art that absorbent paper webs are the most economical and, generally, the best performing materials suitable for use as the core of the surface wiping device of this invention. Consequently, it is preferred that the core comprise an absorbent paper web.

Suitable paper webs include those webs commonly used for paper towel products. In particular, paper webs formed by the papermaking process described in U.S. Pat. No. 3,301,746 (issued to Sanford and Sisson on Jan. 31, 1967) and in U.S. Pat. No. 3,994,771 (issued to Morgan and Rich on Nov. 30, 1976) are especially preferred. Both of these patents are incorporated herein by reference.

As especially preferred core is made by the process of U.S. Pat. No. 3,301,746 and comprises northern softwood kraft pulp which contains 7.5 killograms per metric ton of pulp Parez 631 NC modified polyacrylamide wet strength resin (as manufactured by American Cyanamid Company of New York, N.Y.), and which has a basis weight of about 47 grams per square meter. It has an absorbent capacity of 7.3 grams per gram, a dry wicking rate of 7.5 seconds, a wet wicking rate of 18.6 seconds, and a compressibility of 23%.

The surface contacting elements used in this invention must be strong, absorbent, slightly compressible materials. While they can be woven fabrics or wet strength paper, nonwoven fabrics are preferred. Further, nonwoven fabrics made from synthetic fibers are particularly preferred.

Since the outer must be absorbent, the fibers from which it is fabricated should be water sensitive (i.e. absorbent). Rayon and mixtures of rayon and polyester are particularly suitable. Other materials can be used, even materials which require special processing or treatment to give them the requisite absorbency, strength, etc.

The surface contacting elements should have an absorbent capacity greater than about 6.5 grams per gram. Their wet wicking rates should be less than about 25 seconds and their compressibility should be between about 15% and about 35%. Their basis weights should be from about 18 to about 95 grams per square meter.

While the nonwoven materials used as outers can comprise either bonded fibers or mechanically entangled fibers, a preferred material is one prepared by a process which tends to provide apertures within the fabric, such as the fluid jet entanglement process described by Kalwaits in U.S. Pat. No. 2,862,251 which issued Dec. 2, 1958.

Especially preferred for use as outers are the materials sold under the Sontara tradename by E. I. Du Pont deNemours & Co., Inc. of Wilmington, DE. Sontara comprises a web of staple length fibers which have been hydraulically needled or entangled. Of particular interest is the Sontara made from 70% rayon and 30% polyester which has a basis weight of about 38 grams per square meter, an absorbent capacity of about 8.1 grams per gram, a wet wicking rate of about 23 seconds, and a compressibility of 27%. Also suitable are those Sontara fabrics made from 100% rayon and 50% rayon in combination with 50% polyester. These latter two materials have, respectively, basis weights of 31 and 37 grams per square meter, absorbent capacities of 8.8 and 7.6 grams per gram, wet wicking rates of 14 and 17 seconds, and compressibilities of 23% and 31%.

As noted previously in this specification, the surface wiping device of this invention must have sufficient strength to withstand practical usage. This means, as a practical matter, that the surface contacting element must be inherently strong enough to impart to the surface wiping device the requisite strength. As used in this context, strength includes tensile strength, tearing resistance, and abrasion resistance.

To form the surface wiping device of this invention, at least one inner element and at least two surface contacting elements are laminated with their planar surfaces together and with the inner element (or elements) interposed between the surface contacting elements. Preferably, a single inner element is interposed between two identical surface contacting elements as shown in FIG. 2. (While FIG. 2 is literally a cross-sectional view of the surface wiping device 4 shown in FIG. 1, wherein the section is taken along line 2—2, FIG. 2 is also a generalized representation of any three-element surface wiping device of this invention.) Reference numeral 1 indicates the inner element (core) while reference numerals 2 and 3 indicate the surface contacting elements (outer layers). Preferably, the three elements are coextensive, are superimposed, and are in register one with another.

As noted, the surface contacting elements 2 and 3 are preferably identical, although under certain circumstances it can be desirable to have the two elements dissimilar. In FIG. 2, the core and each surface contacting element are shown as single, unitary elements. While this is the most preferred construction, any of the three elements can comprise a plurality of subelements.

Any conventional method of laminating can be used. For example, the three elements can be sewn together around their common periphery and, optionally, in continuous or discontinuous locations across their common surfaces. Preferably, the three elements are laminated by use of a latex adhesive. The latex adhesive is printed in a continuous or discontinuous pattern on the surface of one or more elements and the elements are urged together for the time necessary to obtain a bond as by the curing of the latex adhesive.

Figure 1:
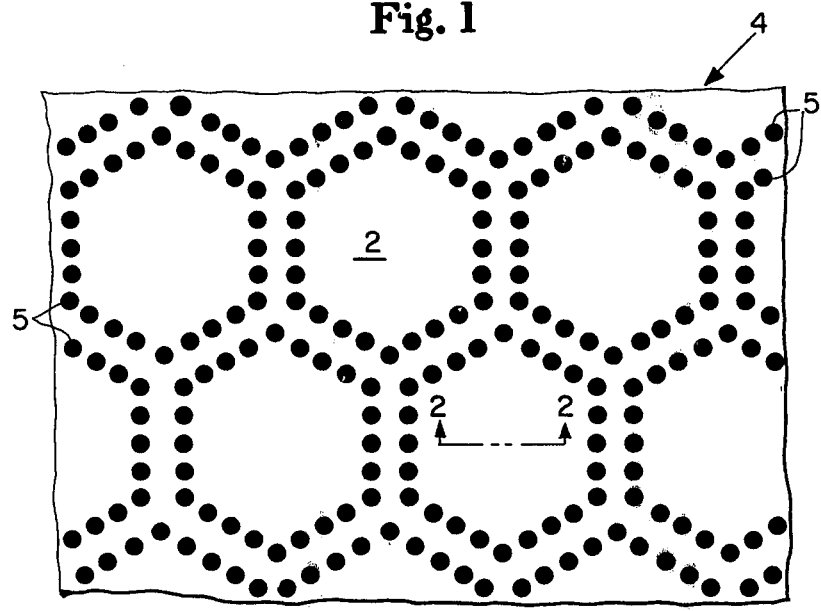
FIG. 1 is a fragmentary plan view of an embodiment of a surface wiping device of this invention and shows a preferred pattern of bonding latex application.

FIG. 1 is a plan view of a portion of a preferred disposable surface wiping device of this invention. Reference numeral 4 refers to the surface wiping device generally and reference numeral 2 refers to a surface contacting element. Reference numeral 5 refers to discontinuous regions of applied latex adhesive, which discontinuous regions can be called "spots" or "dots." As shown in FIG. 1, the spots of latex adhesive are arranged in a repeating double hexagonal pattern. The distance between parallel sides of the innermost hexagon can be from about 1.25 to about 5 centimeters and of the outermost hexagon from about 3 to about 8 centimeters. Spots of latex adhesive can be from about 1 to about 5 milliliters in diameter and can be from about one to about four diameters apart. The amount of latex adhesive in each spot will depend upon the nature of the adhesive and of the material to be laminated; it can be readily determined by one skilled in the art.

While the pattern of latex adhesive shown in FIG. 1 is a preferred pattern, it is to be understood that it is not the only useful pattern and this invention is not to be considered so limited.

The latex adhesive can be any material suitable for uniting paper webs or nonwoven webs. Such materials as acrylic polymers and styrene-butadiene polymers, with or without dyes and curing enhancers, are suitable.

As indicated above, surface wiping devices must possess certain physical and performance characteristics. They must, for example, be absorbent and strong; they must be capable of retaining and dispensing sufficient water, after wringing, to clean surface soil; and they must leave the surface essentially dry. When the inner elements and the surface contacting elements described above are laminated to form surface wiping devices, the surface wiping devices will have the requisite physical and performance characteristics.

The surface wiping devices of this invention have an absorbent capacity greater than about 6 grams per gram. They should have dry and wet wicking rates of less than about 16 seconds. Further, when the surface wiping devices contain an inner element and two identical surface contacting elements, the fluid retained in the surface wiping device after it has been passed through the Atlas Wringer as hereinbefore described is distributed so that the ratio of fluid, expressed in terms of grams of fluid per gram of element, remaining in a single outer layer to that remaining in the core is from about 0.20 to about 1.7. This ratio is known as the distribution factor.

The surface wiping device must be strong enough to withstand normal usage; the minimum required strength to meet this use requirement is demonstrated by the simulated manual wringing test. As use herein, simulated manual wringing refers to a technique wherein a surface wiping device is twisted or rotated about itself. The surface wiping device to be tested is cut to a size of 20.4 centimeters long by 7.6 centimeters wide. It is folded in half to form a doubled surface wiping device 20.4 centimeters long and approximately 3.8 centimeters wide. After soaking for 30 seconds in room temperature distilled water, the folded surface wiping device is placed between two flat-jawed clamps which are at least as wide as the folded surface wiping device. The clamps are so arranged as to allow 21.6 centimeters of folded surface wiping device to be unsupported horizontally between them. The folded surface wiping device is gently urged into essentially a horizontal orientation and the clamps are secured. The clamps are 2.5 centimeters deep and one end of the folded surface wiping device is placed in register with the outermost edge of one clamp. Should any portion of the folded surface wiping device extend beyond the outermost edge of the other clamp because the device has elongated when it was saturated with water, such portion is measured and any subsequent calculations are adjusted to account for this "excess" material which cannot be used per se in the simulated manual wringing test. One clamp remains fixed while the other is rotated through ten 360° revoulutions. The folded surface wiping device is, of course, twisted in rope-like fashion. If the surface wiping device is not torn to such an extent as to render it unusable, it is considered to be strong enough for the purposes of this invention.

In addition, the above-described simulated manual wringing test is used to determine the ability of a surface wiping device to retain fluid during wringing. The dry weight of the surface wiping device subjected to the simulated manual wringing test is obtained as is the weight of the saturated sample after wringing. The difference between these two weights is the amount of fluid remaining in the surface wiping device after wringing. Dividing this value by the total amount of fluid absorbed by the surface wiping device before wringing, and multiplying the quotient by 100, yields a figure known as the retention value which expresses, as a percentage, the relative amount of water remaining in the surface wiping device after wringing. It is preferred that the surface wiping devices of this invention have a retention value of at least 40 percent.

Of the performance characteristics of a surface wiping device, two of the most important relate to the ability of the surface wiping device to clean a large number of tables after a single rinsing and wringing and the ability of the surface wiping device to leave a cleaned surface essentially dry. As used herein, the ability of the surface wiping device to clean a number of tables is measured by the effective use time. To measure the effective use time of a surface wiping device, a convenient sized sample is cut from such device and the sample is submerged in room temperature distilled water for 30 seconds. It is then passed through the Atlas Wringer as described above before being carefully wrapped about a soft backing member such as a softened sponge. The backing member is sized so that a surface wiping device sample measuring 5.1 centimeters square is presented for testing. This sample, supported by the backing member, is urged against a smooth acrylic plastic test surface by a loading of 861 grams. Dry test surface, traveling at a rate of 2.9 meters per minute, is passed under the loaded sample. At intervals of 20 seconds, the sample is evaluated for its ability to continue to deliver sufficient water under manual pressure to allow a table surface to be cleaned. The time in seconds during which the sample can be subjected to the test without becoming too dry for use is designated the effective use time.

For comparison purposes, the surface wiping device described in Example 1 below has an effective use time of 60 seconds. It has been experimentally determined that the 35.5 centimeter by 45.7 centimeter surface wiping device having an effective use time of 60 seconds can be used to wipe approximately 27 one-meter square tables before becoming too dry for effective cleaning. Further, a surface wiping device having an effective use time of 80 seconds has been found to be able to wipe approximately 35 one-meter square tables.

The surface wiping devices of this invention should have an effective use time of at least about 40 seconds.

In addition to having a satisfactory effective use time, a surface wiping device of this invention must have the ability to leave a surface essentially dry after wiping. A surface is essentially dry when immediately after wiping the water remaining on the surface will evaporate under ambient conditions in less than about 30 seconds. Further, the water remaining on the surface must be present in the form of small droplets so as to avoid the presence of visible streaks and spots on the surface after it dries under ambient conditions. These two requirements will be met if the droplets remaining on the wiped surface are less than about 2.75 millimeters in size. To determine the size of droplets left on a wiped surface, a surface wiping device is submerged for 30 seconds in room temperature distilled water and is passed through the Atlas Wringer as hereinbefore described. The damp surface wiping device is then manually drawn across approximately 1 meter of dark acrylic plastic surface. The water remaining on the surface will form into beads or droplets which are eliptical in shape and which have their major axis parallel to the direction of wiping. The five largest drops are immediately selected visually and each major axis is measured. The arithmetic average of these five measurements is designated the droplet size.

The surface wiping devices of this invention exhibit improved resistance to evaporative drying.

The surface wiping devices of this invention are also characterized by excellent hand properties including feel, drape and conformability or flexibility.

In order to more fully describe this invention, and not by way of limitation, the following examples are presented.

EXAMPLE 1

A single inner absorbent element comprising the hereinbefore described especially preferred core was interposed between two identical surface contacting elements each comprising the hereinbefore described Sontara nonwoven fabric made from 70% rayon and 30% polyester fibers. The three elements were laminated together with an acrylic polymer applied in the form of two millimeter diameter spots placed about 4.5 millimeters apart and arranged in a repeating double hexagonal pattern wherein the distance between parallel sides of the innermost hexagon about 3.1 centimeters and of the outermost hexagon about 4.4 centimeters. The surface wiping device was 35 centimeters by 45.7 centimeters. It had an absorbent capacity of 6.7 grams per gram, a dry wicking rate of 4.7 seconds, a wet wicking rate of 5.3 seconds, a retention value of 45%, a distribution factor of 0.53, an effective use time of 60 seconds, and left 0.4 millimeter droplets on a wiped surface.

EXAMPLE II

A surface wiping device was made as in Example I except the surface contacting elements were the hereinabove described 100% rayon Sontara nonwoven fabric. The surface wiping device had an absorbent capacity of 7.3 grams per gram, a dry wicking rate of 5.4 seconds, a wet wicking rate of 5.6 seconds, a retention value of 45%, a distribution factor of 0.73, an effective use time of 60 seconds, and a droplet size of about 0.6 millimeter.

EXAMPLE III

A surface wiping device was made as in Example I except the surface contacting elements were Sontara fabric made from 100% rayon fiber having a basis weight of 57 grams per square meter, an absorbent capacity of 8.2 grams per gram, a wet wicking rate of 13 seconds, and a compressibility of 29%. The surface wiping device had an absorbent capacity of 8 grams per gram, a dry wicking rate of 3.2 seconds, a wet wicking rate of 6.6 seconds, a retention value of 40%, a distribution factor of 0.78, an effective use time of 40 seconds, and a droplet size of about 0.4 millimeter.

EXAMPLE IV

A surface wiping device was made as in Example I except the surface contacting elements were the hereinbefore described 50% rayon and 50% polyester Sontara nonwoven fabric. The surface wiping device had an absorbent capacity of 8 grams per gram, a dry wicking rate of 13 seconds, a wet wicking rate of 6.2 seconds, a retention value of 0.46, an effective use time of 60 seconds, and a droplet size of about 1.2 millimeters.

While the surface wiping device of this invention has been described in relation to restaurant towels or wiping implements and in terms of specific embodiments of such towels, or implements, it is to be understood that the surface wiping devices of this invention have many uses beyond restaurant towels or implements and have many embodiments beyond those specific ones described herein.

What is claimed is:

1. A disposable surface wiping device comprising one inner absorbent element and at least two surface contacting elements wherein said surface wiping device has an absorbent capacity greater than about 5.9 grams per gram of device, a dry horizontal wicking rate less than about 16 seconds, a wet horizontal wicking rate less than about 16 seconds, a distribution factor of from about 0.2 to about 1.7, and an effective use time greater than about 40 seconds; wherein said surface contacting elements each have an absorbent capacity greater than about 6.5 grams per gram of element, a wet horizontal wicking rate less than about 27 seconds, and a compressibility of from about 15 to about 35%; wherein said inner absorbent element has an absorbent capacity greater than about 6.5 grams per gram of element, a dry horizontal wicking rate less than about 30 seconds, and a wet horizontal wicking rate less than about 20 seconds; and wherein said surface wiping device is strong enough for practical use and leaves a wiped surface essentially dry.

2. The surface wiping device of claim 1 wherein said surface contacting elements each have a basis weight of from about 18 to about 95 grams per square meter.

3. The surface wiping device of claim 2 wherein said surface contacting elements are essentially identical.

4. The surface wiping device of claim 2 or 3 wherein said inner absorbent element has a basis weight of from about 16 to about 80 grams per square meter.

5. The surface wiping device of claim 4 wherein said inner absorbent element comprises more than one subelement.

6. The surface wiping device of claim 4 wherein said surface contacting elements each comprise more than one subelement.

7. The surface wiping device of claim 4 wherein said inner absorbent element and said surface contacting elements each comprise more than one subelement.

8. The surface wiping device of claims 1, 2, or 3 wherein said inner absorbent element comprises more than one subelement.

9. The surface wiping device of claims 1, 2, or 3 wherein said surface contacting elements each comprise more than one subelement.

10. The surface wiping device of claims 1, 2, or 3 wherein said inner absorbent element and said surface contacting elements each comprise more than one subelement.

* * * * *